US011163552B2

(12) United States Patent
Nadgowda et al.

(10) Patent No.: US 11,163,552 B2
(45) Date of Patent: Nov. 2, 2021

(54) FEDERATED FRAMEWORK FOR CONTAINER MANAGEMENT

(71) Applicant: International Business Machines Corporation, Armonk, NY (US)

(72) Inventors: Shripad Nadgowda, Elmsford, NY (US); Priya Ashok Nagpurkar, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/383,838

(22) Filed: Apr. 15, 2019

(65) Prior Publication Data

US 2020/0326931 A1 Oct. 15, 2020

(51) Int. Cl.
| | |
|---|---|
| *G06F 9/44* | (2018.01) |
| *G06F 8/658* | (2018.01) |
| *G06F 8/41* | (2018.01) |
| *H04L 12/24* | (2006.01) |
| *G06F 8/71* | (2018.01) |

(52) U.S. Cl.
CPC .............. *G06F 8/658* (2018.02); *G06F 8/427* (2013.01); *G06F 8/71* (2013.01); *H04L 41/082* (2013.01); *H04L 41/085* (2013.01); *H04L 41/0866* (2013.01)

(58) Field of Classification Search
CPC . G06F 8/658; G06F 8/427; G06F 8/71; H04L 41/082; H04L 41/085; H04L 41/0866
See application file for complete search history.

(56) References Cited

U.S. PATENT DOCUMENTS

| | | |
|---|---|---|
| 5,873,097 A | 2/1999 | Harris et al. |
| 7,206,827 B2 | 4/2007 | Viswanath et al. |
| 7,971,049 B2 | 6/2011 | TeNgaio et al. |
| 8,200,634 B2 | 6/2012 | Driesen et al. |
| 8,407,696 B2 | 3/2013 | Alpern et al. |
| 9,213,541 B2 | 12/2015 | Araya et al. |
| 9,594,548 B2 | 3/2017 | Pena et al. |
| 9,672,078 B2 | 6/2017 | Kacin et al. |
| 10,089,099 B2 | 10/2018 | Chang et al. |
| 2003/0037320 A1* | 2/2003 | Lovvik ................. G06F 9/4488 717/148 |
| 2004/0060035 A1* | 3/2004 | Ustaris ...................... G06F 8/71 717/100 |
| 2006/0184935 A1* | 8/2006 | Abels .................... G06F 9/5077 718/1 |

(Continued)

*Primary Examiner* — Hang Pan
(74) *Attorney, Agent, or Firm* — Lieberman & Brandsdorfer, LLC

(57) ABSTRACT

Embodiments relate to a system, program product, and method for evaluating and controlling configuration of a build manifest. An application build manifest is discovered and is subjected to parsing process in which one or more components that comprise the application are identified. The build manifest is monitored for changes to the identified components, and a change notification is generated in response to a change in an identified component. Each generated change notification is assigned a classification. The change notifications are applied selectively to update the manifest, wherein the selective update is based on the classification of the change notification.

20 Claims, 8 Drawing Sheets

(56) References Cited

U.S. PATENT DOCUMENTS

| | | | |
|---|---|---|---|
| 2009/0007093 A1* | 1/2009 | Lin | G06F 11/08 717/174 |
| 2014/0053135 A1* | 2/2014 | Bird | G06F 11/008 717/124 |
| 2014/0095694 A1* | 4/2014 | Kimmet | G06F 11/3003 709/224 |
| 2016/0350081 A1* | 12/2016 | Kumar | G06F 8/30 |
| 2017/0052772 A1* | 2/2017 | Chen | G06F 8/60 |
| 2017/0090889 A1* | 3/2017 | Hale | G06F 8/433 |
| 2018/0011700 A1* | 1/2018 | Plate | G06F 8/65 |

* cited by examiner

FEDERATED FRAMEWORK FOR CONTAINER MANAGEMENT

BACKGROUND

The present embodiments relate to an application build manifest and encapsulation of dependent elements. More specifically, the embodiments relate to an automated technique for monitoring changes to the dependent elements and selectively updating the manifest to reflect the changes.

A container image is a static file that includes executable code to run an isolated process on an information technology (IT) infrastructure. The image is comprised of a composition of system libraries, tools, and platform settings a software program needs to run on a containerization platform. The container image is compiled from file system layers built onto a parent or base image. The container image contains read-only layers, and as such, once the image is created it is never modified. The container image can be updated over time to introduce functionality, correct errors, etc., by creating a new container image.

A build manifest is a document that contains configuration information and commands needed to assemble the container image. The manifest is a description of how the container image is created, including dependency of elements that comprise the container image. At such time as one or more dependent elements in the container image are subject to change, the container image that employs one or more of the changed dependent elements is outdated. The change of at least one dependent element affects functionality of the container image. Accordingly, there is a need to leverage or adapt the functionality of the build manifest to manage dependent element changes, and to transparently reflect such changes into the container image.

SUMMARY

The embodiments include a system, computer program product, and method for evaluating and controlling configuration of an application build manifest, including automatically monitoring changes to dependent elements of the manifest and selectively updating the manifest to reflect the changes.

In one aspect, a system is provided with a computer platform and one or more associated tools for evaluating and controlling configuration of a build manifest. A processing unit is operatively coupled to memory and is in communication the tools, including a parser, a manager, and a director. The parser functions to discover the application build manifest and identifies one or more components that comprise the application. The manager functions to identify any changes to the identified components in the manifest and to create a change notification responsive to any identified changes. Upon generation of a change notification, the director functions to selectively apply the notification and replace the manifest with an updated manifest.

In another aspect, a computer program product is provided to evaluate and control configuration of a build manifest. The program code is executable by a processing unit to discover an application build manifest and identify one or more components that comprise the application. The program code monitors and identifies changes to the identified components in the manifest, and generates a change notification in response to an identified component change. Program code is also provided to selectively apply the notification and replace the manifest with an updated manifest.

In yet another aspect, a method is provided for evaluating and controlling a configuration of a build manifest. An application build manifest is discovered and parsed to identify one or more components that comprise the application. The build manifest is monitored for changes to the identified components in the manifest, and a change notification is generated in response to an identified component change. The manifest is selectively updated, including updating the manifest with the identified change and replacing the manifest with an updated manifest.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A third party or open source software that is required as part of a container image to build and run an application is classified as a basic software element for that application. Examples of these basic software elements include, but are not limited to, a base image, an operating system package, and a language runtime package. The container image is an executable file that is composed of two or more of the basic software elements, referred to herein as dependent components. Accordingly, the container image encapsulates the dependent components and their associated dependent relationships required to run the application.

Figure 1:
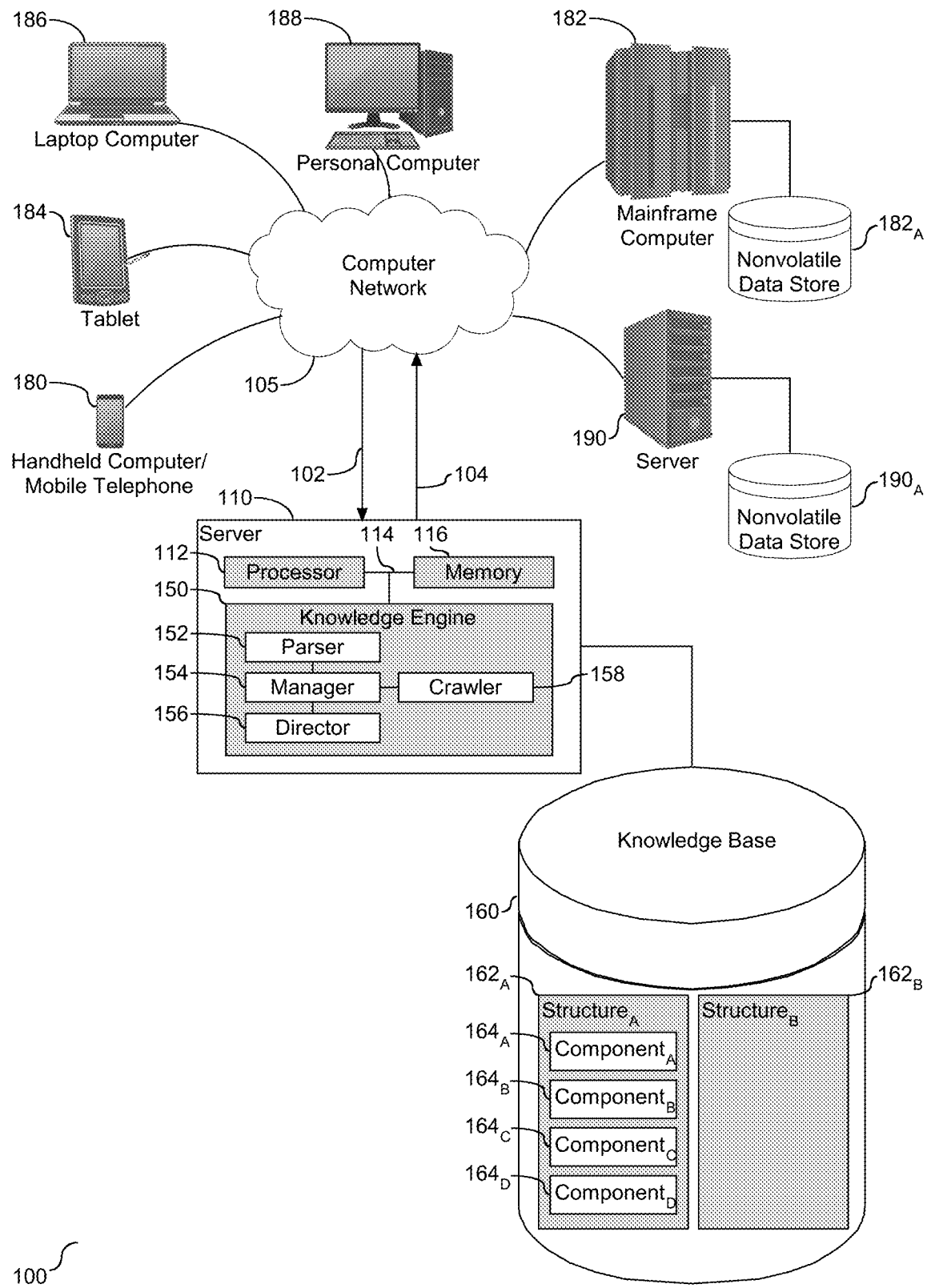
FIG. 1 depicts a system diagram illustrating a computer system and associated components for discovering and managing constituent components of an application.

Referring to FIG. 1, a block diagram (100) of a computer system and associated components for discovering and managing constituent components of an application is provided. As shown, a server (110) is provided in communication with a plurality of computing devices (180), (182), (184), (186), (188), and (190) across a network (105) and associated network connections. The server (110) is configured with a processing unit (112) in communication with memory (116) across a bus (114). The server (110) is shown with a knowledge engine (150) operatively coupled to the processing unit (112) and configured to support and manage an application build manifest and represented dependent components that comprise the manifest. One or more computing devices (180), (182), (184), (186), (188), and (190) are also shown operatively coupled to the network (105). In one embodiment, one or more of the computing devices (180)-(190) may be locally coupled to the server (110). Similarly, in one embodiment, the server (110) may be a shared remote processing device accessible across the network (105). In another embodiment, one or more of the computing devices (180)-(190) may be a shared remote processing device. The computing devices (180)-(190) communicate with each other and with other devices or components via one or more wired and/or wireless data communication links, where each communication link may comprise one or more of wires, routers, switches, transmitters, receivers, or the like. In this networked arrangement, the server (110) and the network connection (105) may enable notification processing and modeling for one or more constituent components of the application. Other embodiments of the server (110) may be used with components, systems, sub-systems, and/or devices other than those that are depicted herein.

The knowledge engine (150) is configured to communicate with remote shared resources over a communication network. For example, the knowledge engine (150) may communicate with one or more of the computing devices (180)-(190), and associated data storage. As shown, the knowledge engine (150) is in communication with a shared remote computing device (190), operatively coupled to a data center ($190_A$), also referred to herein as a shared data storage location. The knowledge engine (150) is operatively coupled to a knowledge base (160) of one or more manifests, represented herein as $structure_A$ ($162_A$) and $structure_B$ ($162_B$). The various computing devices (180), (182), (184), (186), (188), and (190) shown in communication with the network (105) may include access points for management of the manifest(s). The network (105) may include local network connections and remote connections in various embodiments, such that the knowledge engine (150) may operate in environments of any size, including local and global, e.g. the Internet.

The knowledge engine (150) may serve as a back-end system that can identify manifests and constituent components that comprises the manifests, as well as corresponding modifications to one or more of the manifests as reflected in changes of one or more encapsulated dependent components. As shown in FIG. 1, the knowledge engine (150) functions to identify and manage changes to the manifests as reflected in changes to one or more of the constituent components, e.g. dependent components. The knowledge engine (150) is shown herein with tools to support the identification and management of the manifest and the encapsulated dependent components. The tools are shown herein as a parser (152), a manager (154), a director (156), and a crawler (158). In one embodiment, one or more of the tools (152)-(158) may be combined. The tools represented herein support management of the manifest and the components that comprise the manifest.

As shown, the parser (152) functions to interface with one or more manifests, and more specifically to identify the dependent components that comprise the manifest and discover their dependencies with respect to an arrangement of the manifest components. In one embodiment, the manifest components may be arranged in a hierarchy with a layering of the components and the dependencies. In one embodiment, the parser (152) recursively captures the manifest components. The parsed components and discovered dependency relationship(s) are reflected in the knowledge base (160). As shown, the knowledge base is populated with a plurality of structures, including $structure_A$ ($162_A$) and $structure_B$ ($162_B$). Although only two structures are shown, this quantity should not be considered limiting. In the example shown herein, each structure ($162_A$) and ($162_B$) represents the parsed and discovered components of respective manifests, e.g. structure ($162_A$) represents $manifest_A$ and structure ($162_B$) represents $manifest_B$. In one embodiment, a plurality of manifests may be represented in a single structure. In this example, structure ($162_A$) is shown with four dependent components represented in the structure, including $component_A$ ($164_A$), $component_B$ ($164_B$), $component_C$ ($164_C$), and $component_D$ ($164_D$). Although only four components are shown, the quantity should not be considered limiting. Accordingly, the structure(s) represented in the knowledge base (160) identify parsed manifest components and any of their corresponding dependencies.

Figure 2:
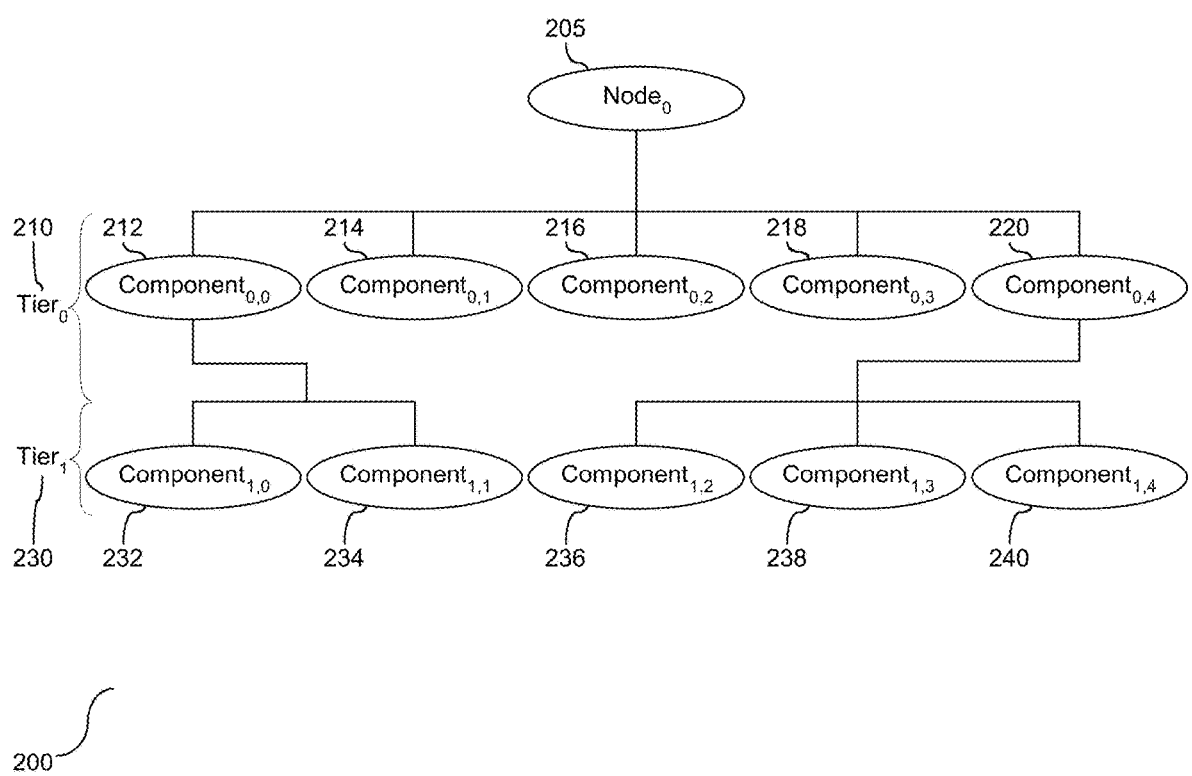
FIG. 2 depicts a block diagram illustrating a hierarchical map of a manifest.

It is understood that the manifest is comprised of two or more dependent components, and the dependent components may be arranged in a structural hierarchy to reflect an arrangement and layering of dependencies among the components. In one embodiment, the dependent components that comprise the manifest may be arranged in a single layer. Similarly, in one embodiment, the manifest may be comprised of a single dependent component. Referring to FIG. 2, a block diagram (200) is provided to illustrate a hierarchical map of a manifest. As shown and described, the hierarchy is an inverted tree structure in which a plurality of dependent components are grouped in the layering. As shown in this example, the hierarchy is shown with a root and dependent components either directly or indirectly related to the root. The dependent components may be arranged in a plurality of layers for manifest management. As shown in this example, the manifest represented in the hierarchy is shown with a root node, $node_0$ (205), and a first layer, $tier_0$ (210) with five primary dependent components each directly dependent on the root node (205), including $component_{0,0}$ (212), $component_{0,1}$ (214), $component_{0,2}$ (216), $component_{0,3}$ (218), and $component_{0,4}$ (220). A second layer, $tier_1$ (230) is shown with select further dependencies for select components of the first layer (210). As shown, component$_{0,0}$ (212) is shown with a first grouping of two dependent components, including component$_{1,0}$ (232) and component$_{1,1}$ (234). In addition, component$_{0,4}$ (220) is shown with a second grouping of three dependent components, including component$_{1,2}$ (236), component$_{1,3}$ (238), and component$_{1,4}$ (240). The remaining dependent components in the first layer, including component$_{0,1}$ (214), component$_{0,2}$ (216), and component$_{0,3}$ (218) are shown as not containing further dependencies in the second layer (230). The identified dependencies shown in the hierarchy are reflected in the structure(s) (162). The hierarchy shown and the associated quantity and structure of nodes and associated items represented in the hierarchy is merely an example and should not be considered limiting. The hierarchy is directed at a structure to categorize dependent components of the manifest. As shown and described herein, the dependent components may be classified or otherwise identified responsive to the hierarchical structure. Accordingly, the manifest, which in one embodiment is a complex action plan, is shown herein as a hierarchical structure with a presentation of dependent components.

The discovered and dependent components that comprise the manifest may not be static. One or more of the components may be the subject of an update, a fix, a patch, etc. In the event of an update of one or more of the components, the container image that embodies the manifest is effectively outdated. The manager (154), as shown herein, is operatively coupled to the crawler (158) and the parser (152). The crawler (158) is configured to collect all changes for the manifest components and to reflect those changes in the knowledge base (160). As such, the crawler (158) identifies a change of one or more of the manifest components. In one embodiment, the crawler (158) is configured to scan the manifests, and more specifically the components that comprise the manifest to identify any changes. As shown and described in FIG. 5, the crawler (158) collects component data and changes to the component data, which in one embodiment takes place by scanning the manifest or the manifest components. For example, the manager (154) may dictate instructions to the crawler (158) with respect to scanning the manifest(s), such as, but not limited to, setting a frequency for such scans and specifying specific manifest or manifest components for scanning.

The director (156) is shown operatively coupled to the manager (154) and the knowledge base (160). As indicated herein, changes to the manifest(s) or components that comprise the manifest(s) are reflected in the knowledge base (160), and more specifically, the structure(s) (162). The director (156) oversees the structure(s) (162) to monitor changes found by the crawler (158), and assesses applicability of such changes to the corresponding manifest. In one embodiment, the crawler (158) sends a notification to the director (156) that one or more of the manifest components have been subject to change. The director (156) assesses the scope of the detected manifest changes as reflected in the structure(s). For example, as changes are detected or identified, the director (156) classifies the changes into one or more categories, such as security update(s), bug fixes, etc. In one embodiment, the director (156) aggregates the detected changes for each category. It is understood in the art that some manifest changes may be more significant than others, and that significant changes may require an update of the manifest, while insignificant changes may enable the manifest to remain unchanged, e.g. static. Accordingly, the assessment conducted by the director (156), including the change classification and categorization, facilitates management of the corresponding manifest.

In some illustrative embodiments, the server (110) may be the IBM Watson® system available from International Business Machines Corporation of Armonk, N.Y., which is augmented with the mechanisms of the illustrative embodiments described hereafter. The IBM Watson® system may receive the detected and collected manifest changes as electronic input content (102) which it then analyzes to identify the manifest components, the extent of the change(s) to the identified component(s) that in turn are applied to selectively update the manifest and corresponding application image. Based on application of the identified changes to the knowledge base (160), a set of candidate actions are generated by categorization and aggregation of the changes.

Once the scope of the change(s) is ascertained and identified, the director (156) initiates one or more remedial measures to integrate the changes into the container image, or to support selective engagement of such remedial measures. The director (156) evaluates the scope of the detected changes and identifies or selects an action corresponding to the category of the change(s) and/or the extent of the change(s). The category correlates to a type of change, such as a security update, a software code patch, etc. Categorization of the change type facilitates selective determination of a corresponding action, such as a rebuild of the container image or establishing a security policy if the rebuild is either not available or unwarranted. Accordingly, the director (156) evaluates the scope of category of the detected changes to understand and define the detected changes, as well as selective implementation of the changes as reflected in the container image.

It is understood that the goal of management of the container image and analysis of detected element changes is not merely to provide a response in the form of a container image update, but to evaluate the changes, and selectively integrate the identified changes into the container image. It is understood that in one embodiment, the director (156) may identify a plurality of viable actions, hereinafter referred to as candidate actions, and further functions to resolve and narrow the pool of candidate actions. Resolution of the candidate actions includes selectively integrating technical solutions into the container image. Examples of such technical solutions may include an update indicator to demonstrate that the container image is outdated and now updates are available, control an image re-build for any changed element, recommendation of remediation or perform an auto-remediation, dynamically change any security policy, e.g. routing rule, for an outdated image container, and replacement for an image repository to allow a freeze of all dependencies to ensure consistency in the image build.

The parser (152), manager (154), director (156), and crawler (158), hereinafter referred to collectively as tools, are shown as being embodied in or integrated within the knowledge engine (150) of the server (110). The tools (152)-(158) may be implemented in a separate computing system (e.g., 190) that is connected across network (105) to the server (110). Wherever embodied, the tools (152)-(158) function to identify and manage container images, include identification and evaluation of the components that comprise the container images, selective and dynamic integration of identified component changes into the container image, and generate program code aligned with the selective and dynamic integration.

Types of information handling systems that can utilize the knowledge engine (150) range from small handheld devices, such as handheld computer/mobile telephone (180) to large mainframe systems, such as mainframe computer (182). Examples of a handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store $(190_A)$, and mainframe computer (182) utilizes nonvolatile data store $(182_A)$. The nonvolatile data store $(182_A)$ can be a component that is external to the various information handling systems or can be internal to one of the information handling systems.

An information handling system employed to support the knowledge engine (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, the information handling system may embody the north bridge/south bridge controller architecture, although it will be appreciated that other architectures may also be employed.

Figure 3:
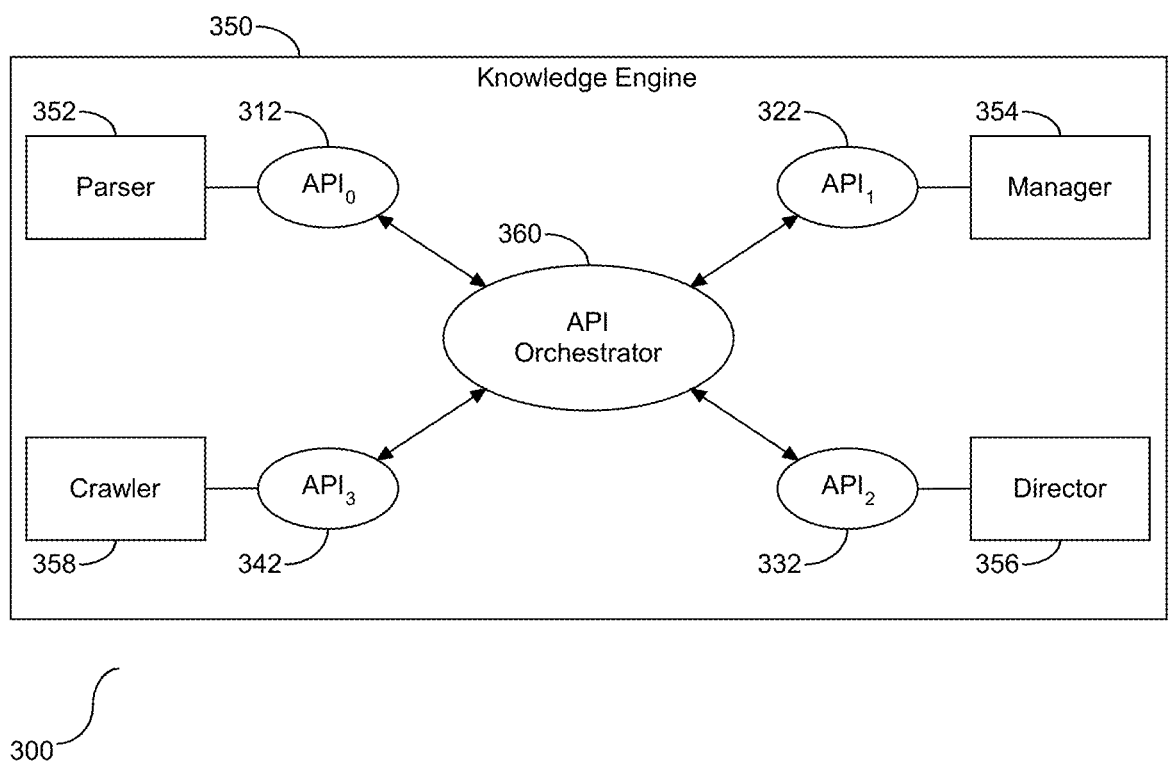
FIG. 3 depicts a block diagram illustrating tool for managing constituent component of an application and their associated APIs.

An Application Program Interface (API) is understood in the art as a software intermediary between two or more applications. With respect to the knowledge engine (150) shown and described in FIG. 1, one or more APIs may be utilized to support one or more of the tools (152)-(158) and their associated functionality. Referring to FIG. 3, a block diagram (300) is provided illustrating the tools (152)-(158) and their associated APIs. As shown, a plurality of tools are embedded within the knowledge engine (350), with the tools including the parser (352) associated with $API_0$ (312), the manager (354) associated with $API_1$ (322), the director (356) associated with $API_2$ (332), and the crawler (358) associated with $API_3$ (342). Each of the APIs may be implemented in one or more languages and interface specifications. $API_0$ (312) provides functional support for discovering and identifying manifest components; $API_1$ (322) provides functional support to subscribe to feeds directed at the crawler (158) and corresponding crawler tasks; $API_2$ (332) provides functional support to collect or scan for changes of the components that comprise the manifest(s) and to reflect or document component and manifest changes in the knowledge base (160); and $API_3$ (342) provides functional support to selectively and dynamically integrate the changes into a corresponding container image. As shown, each of the APIs (312), (322), (332), and (342) are operatively coupled to an API orchestrator (360), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 4:
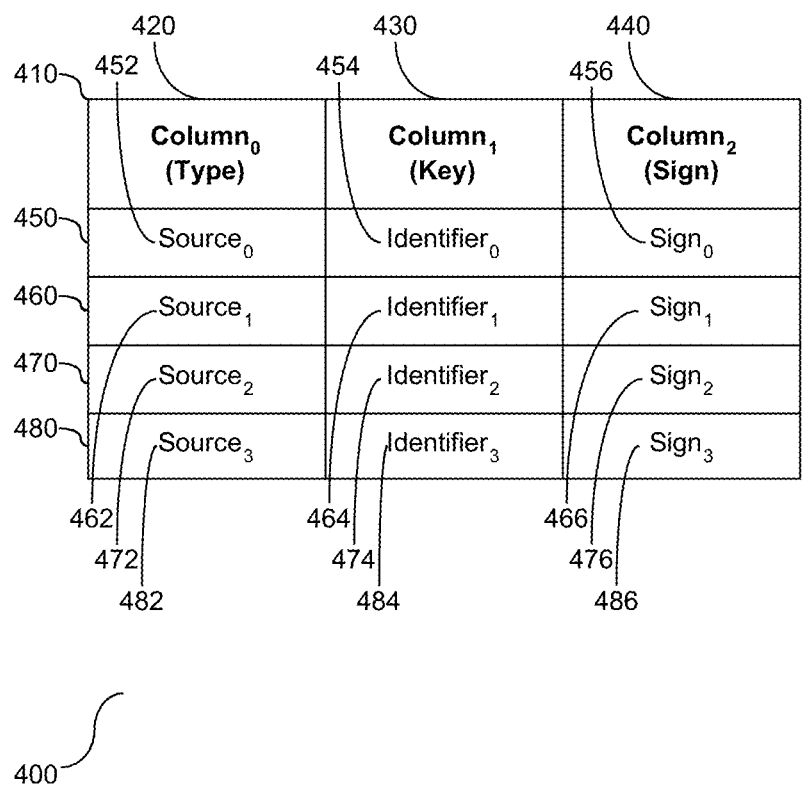
FIG. 4 depicts a block diagram illustrating an example of the knowledge base data structure.

Referring to FIG. 4, a block diagram (400) is provided illustrating an example of the knowledge base data structure, hereinafter referred to as a structure (410). As shown herein, the structure stores the identified manifest components in a format to facilitate change identification and implementation. The structure (410) is shown with three columns, including $column_0$ (420), $column_1$ (430), and $column_2$ (440). $Column_0$ (420) identifies the type of component change identified, which in one embodiment may be referred to a classification of the identified change. The type of component is the source of the notification change, which includes, but is not limited to an image change, an operating system package change, an application package change, etc. $Column_1$ (430) identifies a key for the identified component change. The key is an identifier to identify a particular change. For example, for an image, the identifier may be the name of the image, for a package the identifier may be the package name or a package version, etc. $Column_2$ (440) identifies a sign for the identified component. The sign is a unique identifier for the change, with the sign being different from the identifier corresponding to the key shown in $Column_1$ (430). In one embodiment, the sign functions to uniquely identify a particular change. In the example shown herein, there are four entries, including a first entry (450) shown with a source type designated as $source_0$ (452), with a corresponding key designated as $identifier_0$ (454) and $sign_0$ (456). The second entry (460) is shown with a source type designated as $source_1$ (462), with a corresponding key designated as $identifier_1$ (464) and the $sign_1$ (466). The third entry (470) is shown with a source type designated as $source_2$ (472), with a corresponding key designated as $identifier_2$ (474) and $sign_2$ (476). The fourth entry (480) is shown with a source type designated as $source_3$ (482), with a corresponding key shown as $identifier_3$ (484) and the $sign_3$ (486). The examples of component types, keys, and signs are illustrative and should not be considered limiting. The structure (410) is stored in the knowledge base (160) and is shared and accessible by multiple users. Accordingly, the structure (410) is shown herein populated with types of tools and corresponding keys and signs.

Figure 5:
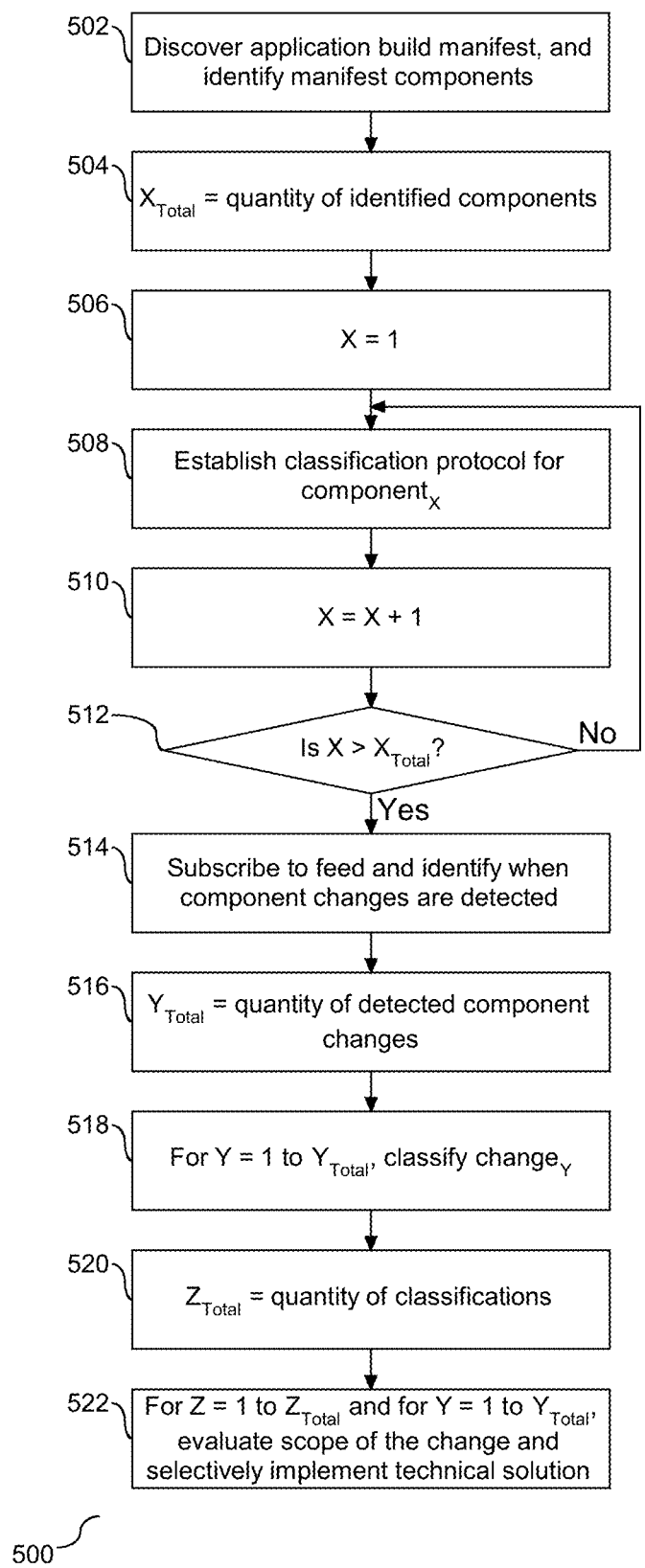
FIG. 5 depicts a flow chart illustrating a process for monitoring elemental changes in an application container.

Referring to FIG. 5, a flow chart (500) is provided illustrating a process for monitoring elemental changes in an application container. An application build manifest comprised of two or more dependent components is discovered or otherwise identified, and the components that comprise the manifest are identified (502). As shown and described in FIG. 1, the parser (152) identifies the components, including implementation of a recursive technique to capture all of the components and component dependencies. The components include elements that the application manifest depends upon for support and function. It is understood that one or more of the components may have further component dependencies, e.g. a layering of dependent components and sub-components. In one embodiment, the identification at step (502) includes recursively capturing all of the components, including primary components, sub-components, etc. The variable $X_{Total}$ is assigned to the quantity of identified components (504), and a corresponding component counting variable is initialized (506). For each component, $component_x$, a classification protocol is established (508). The classification protocol includes subscribing to a change notification of $component_x$, which sets parameters of how and when a notification should be issued for a detected change corresponding to component$_x$, or configuring when the crawler (158) should scan for changes to component$_x$. The establishment of the classification protocol includes registering the build manifest with the manager (154) to establish a protocol for monitoring and identifying changes to the manifest components.

Following step (508), the component counting variable is incremented (510), followed by determining if the classification protocol subscription has been established for each of the identified components (512). A negative response to the determination at step (512) is followed by a return to step (508), and a positive response concludes the classification protocol subscription. Accordingly, for each component identified in the application container, a classification protocol subscription is established to support management of application container changes.

As shown and described in FIGS. 1 and 4, the identified components of the build manifest elements are reflected in a corresponding data structure. The crawler (158) scans and/or collects component data and changes to the component data, and reflects the changes in the corresponding data structure (512). In one embodiment, the functionality of the crawler takes place at a set or configurable frequency, with the detected changes dynamically processed and entered into the corresponding data structure. The manager (154) subscribes to a feed managed by the crawler (158) to identify when changes to the components are detected. In one embodiment, the manager (154) is notified when a change to the data structure takes place (514). The variable $Y_{Total}$ is assigned to the quantity of detected component changes (516). Each detected component change is subject to classification identification (518). Specifically, each component that is the subject of the change is identified, and the change is classified. The quantity of classifications for the identified changes is assigned to the variable $Z_{Total}$ (520). For each of the identified change$_Y$ in each classification$_Z$, the scope of the identified change is evaluated for selective implementation of the change (522). In one embodiment, the scope evaluation includes an assessment of the changes with respect to the corresponding image container to determine if the changes affect the integrity and functionality of the image container. As shown at step (522), for each of the evaluated changes, a technical solution is selectively implemented. Examples of technical solutions includes, but is not limited to, indicia to demonstrate that new updates are available for the image container, controlling an image build for any changed elements, recommendation for remediation or perform auto-remediation, dynamically change a security policy, e.g. routing rule, for an outdated image container, and allow a freeze of all dependencies to ensure consistency in the image build. Accordingly, management of the application container and corresponding image discovers and captures dependencies, and employs one or more technical solutions that selectively manage the image container with respect to the discovered and evaluated components of the build manifest and changes to such components.

The identification and image container management shown and described in FIG. 5 demonstrates technical solutions for leveraging the changes into the container. Depending on the scope of the changes, an image container update may be required, or in one embodiment may not be necessary. The selective management utilizes the scope of the changes to determine when the scope of the changes requires or suggests an update to the container image.

The container image evaluation and management shown and described in FIGS. 1-5 may be implemented as a cloud-based resource. With references to FIG. 6, a block diagram (600) is provided illustrating an example of a computer system/server (602), hereinafter referred to as a host (602) in communication with a cloud-based support system, to implement the processes described above with respect to FIGS. 1-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
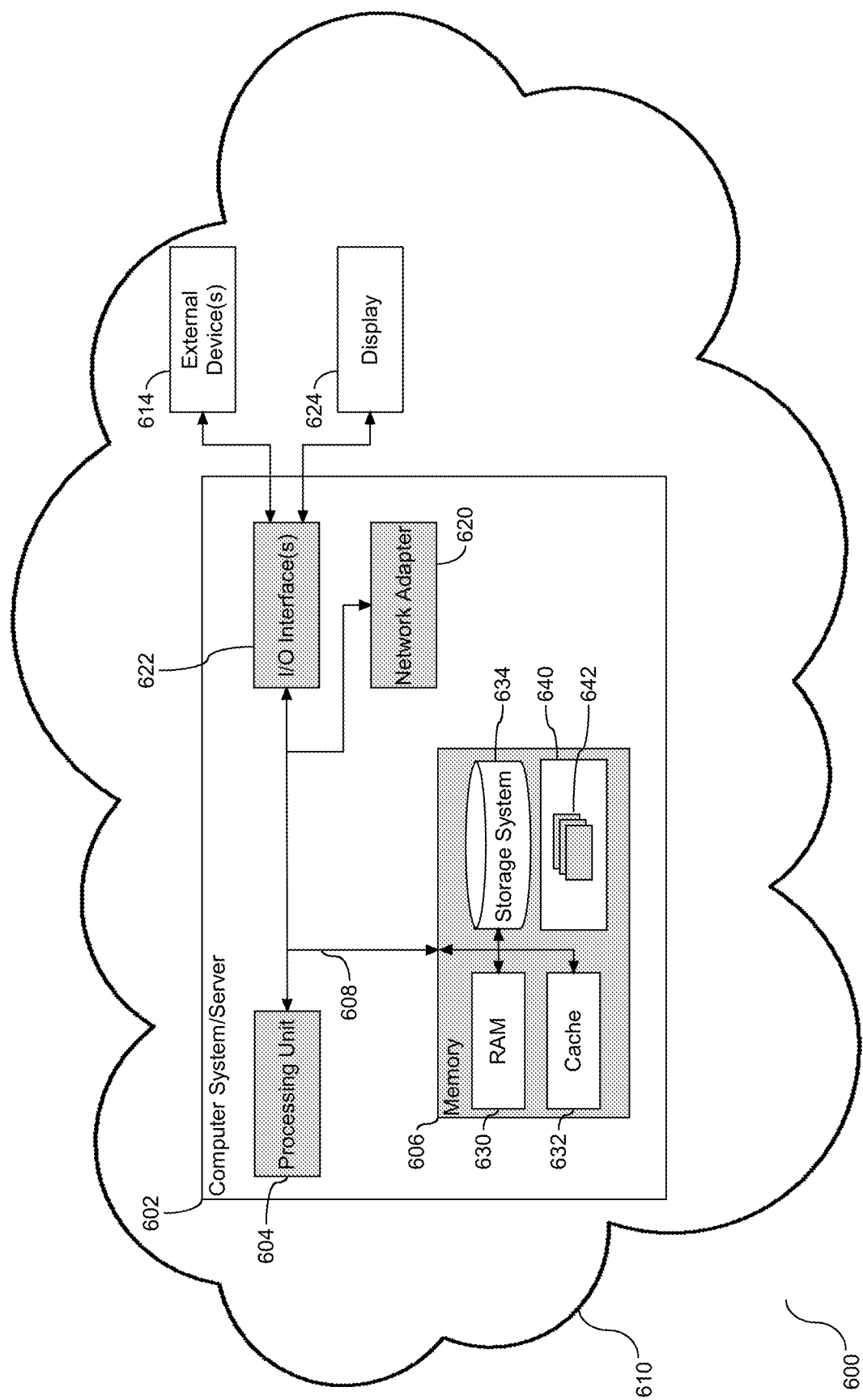
FIG. 6 depicts a block diagram illustrating an example of a computer system/server of a cloud-based support system, to implement the process described above with respect to FIGS. 1-5.

As shown in FIG. 6, host (602) is shown in the form of a general-purpose computing device. The components of host (602) may include, but are not limited to, one or more processors or processing units (604), a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to image container dependency identification, classification, and evaluation, and output directed at a technical solution to selectively reflect any dependency changes into the container image. For example, the set of program modules (642) may be configured as the tools (152)-(158) as described in FIG. 1.

Host (602) may also communicate with one or more external devices (614), such as a keyboard, a pointing device, a sensory input device, a sensory output device, etc.; a visual display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
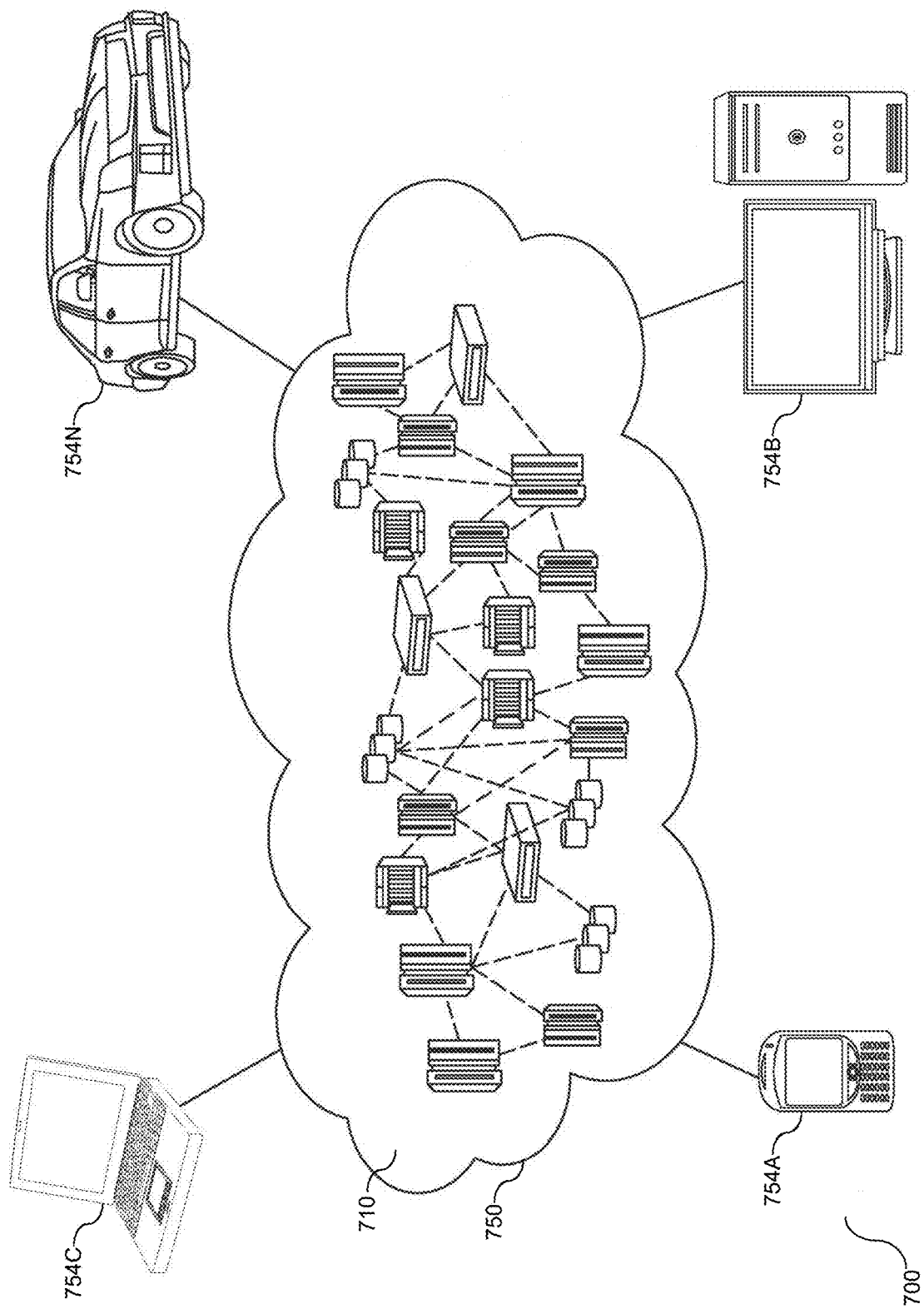
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (755A-N) shown in FIG. 7 are intended to be illustrative only and that the cloud computing environment (750) can communicate with any type of computerized device over any type of network and/or network addressable connection (e.g., using a web browser).

Figure 8:
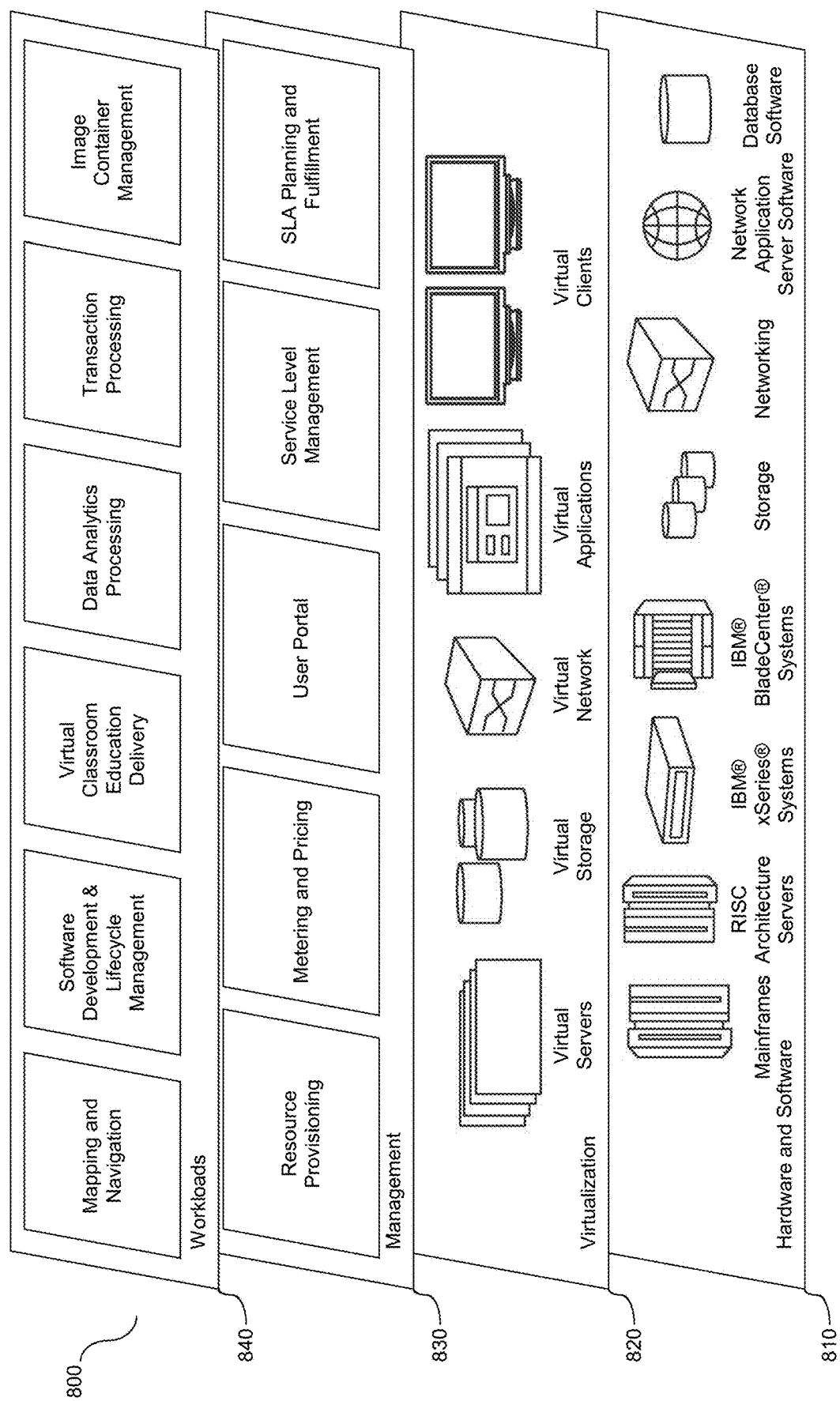
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and image container management.

It will be appreciated that there is disclosed herein a system, method, apparatus, and computer program product for evaluating and processing data and associated data security protocols and ascertaining an inferred set of entities that may a preferred level of privacy. While particular embodiments of the present embodiments have been shown and described, it will be obvious to those skilled in the art that, based upon the teachings herein, changes and modifications may be made without departing from these embodiments and their broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitations no such limitation is present. For non-limiting examples, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of notification processing and delivery.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of these embodiments is limited only by the following claims and their equivalents.

What is claimed is:

1. A system comprising:
   a processing unit operatively coupled to memory; and
   an application build manifest management tool in communication with the processing unit, the tool to evaluate and control configuration of a build manifest, the build manifest containing configuration information and commands for compiling a container image from file system layers comprising dependent components to run an application, wherein the dependent components are subject to change affecting the functionality of the container image, the tool comprising:
      a parser to discover the build manifest and subject the discovered build manifest to a parse process, including identifying one or more of the dependent components to run the application;
      a manager, operatively coupled to the parser, the manager configured to identify changes to the identified one or more dependent components in the build manifest and generate a change notification responsive to one or more of the identified changes; and
      responsive to receiving at least one generated change notification, a director to selectively evaluate a scope of the identified changes for selective implementation of the identified change, including classify the change notification, assign the identified changes to a classification based on the evaluated scope, and selectively update the build manifest based on the classification of the change notification, the selective update comprising identification of a plurality of candidate actions for integration into the container image, including the director to freeze dependencies, and selecting between updating the build manifest, including replacing the build manifest with an updated build manifest based on the scope of the identified changes, or not updating the build manifest.

2. The system of claim 1, further comprises a crawler operatively coupled to the manager, the crawler to configure a scanning protocol and apply the scanning protocol to the build manifest and the one or more identified dependent components.

3. The system of claim 1, wherein the classification includes at least two classes, and further comprising the director to subject the classification to a prioritization protocol and wherein selective application of the change notification to the build manifest further comprises the director to identify the change classification and the prioritization protocol.

4. The system of claim 3, wherein the identified change classification and prioritization protocol drives remediation of the build manifest, including the director to determine timing for application of the identified change to the build manifest.

5. The system of claim 1, wherein the identified change classification comprises a security update, a bug fix, and/or a software code patch.

6. The system of claim 1, further comprising the manager to register the build manifest for change monitoring, including configure a component change notification policy and apply the notification policy to the identified dependent components.

7. The system of claim 1, further comprising the parser to recursively capture dependencies for the dependent components.

8. The system of claim 1, wherein the manifest comprises the dependent components arranged in a hierarchy with a layering of the dependent components and the dependencies for manifest management.

9. The system of claim 1, wherein the container image is non-modifiable once compiled.

10. The system of claim 1, wherein the dependency freeze ensures consistency in the container image.

11. A computer program product to manage an application build manifest, the computer program product comprising:
    a computer readable storage medium or media; and
    program code stored on the computer readable storage medium or media and executable by a processing unit to:
       discover an application build manifest, the build manifest containing configuration information and commands for compiling a container image from file system layers comprising dependent components to run an application, wherein the dependent components are subject to change affecting the functionality of the container image;
       subject the discovered build manifest to a parse process, including identify one or more of the dependent components to run the application;
       identify changes to the identified one or more dependent components in the build manifest and generate a change notification responsive to one or more of the identified changes;
       responsive to receiving at least one generated change notification, selectively apply the generated change notification to the build manifest, including selectively update the build manifest to reflect the one or more identified changes and replace the manifest with an updated manifest; and
       evaluate a scope of the identified changes for selective implementation of the identified change, including classify the change notification, assign the identified changes to a classification based on the evaluated scope, and selectively update the build manifest based on the classification of the change notification, the selective update comprising program code configured to identify a plurality of candidate actions for integration into the container image, including to freeze dependencies, and selecting between updating the build manifest, including replacing the build manifest with an updated build manifest based on the scope of the identified changes, or not updating the build manifest.

12. The computer program product of claim 11, further comprising the program code to register the build manifest for change monitoring, including configure a scanning protocol and apply the scanning protocol to the build manifest and the one or more identified dependent components.

13. The computer program product of claim 11, wherein the classification includes at least two classes, and further comprising program code to subject the classification to a prioritization protocol and wherein selective application of the change notification to the build manifest further comprises program code to identify the change classification and the prioritization protocol.

14. The computer program product of claim 11, wherein the program code to register the build manifest for change monitoring, further comprises program code to configure a component change notification policy and apply the notification policy to the identified dependent components.

15. The computer program product of claim 11, wherein the dependency freeze ensures consistency in the container image.

16. A method comprising:
discovering an application build manifest, the build manifest containing configuration information and commands for compiling a container image from file system layers comprising dependent components to run an application, wherein the dependent components are subject to change affecting the functionality of the container image;
subjecting the discovered build manifest to a parsing process, including identifying one or more of the dependent components to run the application;
identifying changes to the identified one or more dependent components in the build manifest, and generate a change notification responsive to one or more of the identified changes;
responsive to receiving at least one generated change notification, selectively applying the generated change notification to the build manifest, including selectively updating the build manifest to reflect the one or more identified changes and replacing the build manifest with an updated build manifest; and
evaluating a scope of the identified changes for selective implementation of the identified change, including classifying the change notification, assigning the identified changes to a classification based on the evaluated scope, and selectively updating the build manifest based on the classification of the change notification, the selective updating comprising identifying a plurality of candidate actions for integration into the container image, including freezing dependencies, and selecting between updating the build manifest, including replacing the build manifest with an updated build manifest based on the scope of the identified changes, or not updating the build manifest.

17. The method of claim 16, further comprising registering the build manifest for change monitoring, including configuring a scanning protocol and applying the scanning protocol to the build manifest and the one or more identified dependent components.

18. The method of claim 16, wherein the classification includes at least two classes, and further comprising subjecting the classification to a prioritization protocol and wherein selectively applying the change notification to the build manifest further comprises identifying the change classification and the prioritization protocol, wherein the identified change classification and prioritization protocol drives remediation of the build manifest, including determining timing for application of the identified change to the build manifest.

19. The method of claim 16, further comprising registering the build manifest for change monitoring, including configuring a component change notification policy and applying the notification policy to the identified dependent components.

20. The method of claim 16, wherein the dependency freeze ensures consistency in the container image.

* * * * *